United States Patent
Dankert

(10) Patent No.: US 6,955,724 B2
(45) Date of Patent: Oct. 18, 2005

(54) SPRAY-COATING DEVICE FOR A COATING LIQUID

(75) Inventor: Manfred Dankert, Rödermark (DE)

(73) Assignee: ITW Oberflachentechnik GmbH & Co. KG (DE)

( * ) Notice: Subject to any disclaimer, the term of this patent is extended or adjusted under 35 U.S.C. 154(b) by 0 days.

(21) Appl. No.: 10/690,591

(22) Filed: Oct. 23, 2003

(65) Prior Publication Data

US 2004/0079284 A1 Apr. 29, 2004

(30) Foreign Application Priority Data

Oct. 29, 2002 (DE) .......................... 102 50 531

(51) Int. Cl.⁷ .............................................. B05C 11/10
(52) U.S. Cl. ...................... 118/684; 118/685; 118/681; 239/63; 239/67; 239/68
(58) Field of Search ................................ 118/684, 685, 118/681; 239/585.5, 63, 67, 68, 71, 72, 73, 74; 137/595

(56) References Cited

U.S. PATENT DOCUMENTS

| 4,922,852 A | * | 5/1990 | Price .......................... 118/683 |
| 5,152,841 A | * | 10/1992 | Medler et al. .............. 118/704 |
| 6,010,740 A | * | 1/2000 | Rutledge et al. ................ 427/8 |
| 6,681,797 B2 | * | 1/2004 | Mannhart ................ 137/487.5 |

* cited by examiner

*Primary Examiner*—Richard Crispino
*Assistant Examiner*—George R. Koch, III
(74) *Attorney, Agent, or Firm*—Lowe Hauptman Gilman & Berner LLP

(57) ABSTRACT

A spraycoating device includes at least one coating liquid spray gun (2) which contains a measuring valve device (40) opening or closing a compressed gas measuring valve flow path (42) depending on the positions of a liquid feed valve (4). The measurement of the compressed gas flow allows automatically determining whether the liquid feed valve (4) is situated in a fully close or a fully open position or in an arbitrary intermediate position thereto.

12 Claims, 2 Drawing Sheets

SPRAY-COATING DEVICE FOR A COATING LIQUID

FIELD OF THE INVENTION

The present invention relates to a spraycoating device for a coating liquid. In particular, the present invention relates to a spraycoating device containing a coating-liquid spray gun comprising a liquid feed valve fitted with a valve seat and with a valve element for said liquid, said valve element for said liquid being displaceable relative to said seat between a closed and an open valve position.

BACKGROUND OF THE INVENTION

The spraycoating device is composed at least of a spray gun exhibiting the features of the present invention. However this invention also concerns a spraycoating device fitted in addition to said spray gun with a control unit or at least a sensor that are connected to said gun. A spray gun of this kind for coating liquid is known from the European patent document 1,048,359 A2. Moreover it is known from the field of practice to fit the spray gun with an electromagnetic sensor determining whether the valve element for the liquid of the liquid feed valve is situated in the closed or the open valve position. But electromagnetic sensors incur the drawback of being linked by a cable to the spray gun and by being electrically connected to said gun by an electric connector. Specifically said connector is susceptible to becoming defective because illustratively containing a small and easily deforming prong acting as the connecting element, and moreover said electrical cable increases the spray gun weight and degrades its freedom of motion.

Spray guns may be manual devices held manually or they may be automated and supported in a holder while being mounted in displaceable or stationary manner relative to an object. The holder may be a robot or a stand.

Spray guns typically are fitted with at least one electrode which is connected to a high DC voltage source for the purpose of electrostatically charging the coating liquid.

A comparable spray gun for coating liquid also is known from the German patent document 22 09 896 C2.

The above documents also disclose how to feed compressed air acting as atomizing air to the spray gun, in order to positively affect the atomization of the coating liquid, and/or to apply shaping air directed at the liquid sprayed from a spray nozzle in order to shape the spray jet, for instance in order to transform a cross-sectional circular spray jet into a cross-sectionally flat one and/or to prevent liquid particles from leaving the atomized spray jet. Before opening the liquid feed valve discharging and atomizing the coating liquid, the compressed atomizing air and the compressed shaping air already must have been applied in order that the coating liquid shall exhibit from its beginning the required shape and the spray jet quality necessary to optimally coat an object to be coated, because otherwise low quality of coating would ensue. As regards automated object coating, the objects are moved automatically past the spray guns. These spray guns are shut off in the gaps between the objects. In order to coat the objects from beginning to end at the proper quality, the application and shutting off (opening and closing) of the coating liquid and of the compressed atomizing air and/or of the shaping air must be accurately timed. This goal is attained in the state of the art by using electromagnetic sensors to detect the position of the liquid valve element relative to the valve seat for said liquid from the liquid feed valve.

SUMMARY OF THE INVENTION

The invention solves the problem to so design the spraycoating device that it shall be less susceptible to incur defects and that it shall operate more accurately with respect to controlling at least one compressed air flow for controlling the feed of coating liquid.

Accordingly a coating device of the present invention is characterized in that the spray gun contains a measuring valve device mounted in a compressed gas measuring valve flow path and which is ganged to the liquid valve element to implement a common motion, said valve being driven by said valve element, the measuring valve device being configured in such a way that, as a function of the positions of said valve element, it shall always assume a closed position sealing the compressed gas measuring valve flow path when the liquid feed valve assumes its fully closed position, while on the other hand it shall assume an open position keeping open the compressed gas measuring valve path when the valve element for the liquid assumes an arbitrary intermediate position between its fully open and its fully closed liquid valve position, as a result of which there shall be automated determination, depending on compressed gas passing or not through the measuring valve device, whether the liquid valve element assumes one of the two positions of open or closed valve for said liquid or an arbitrary intermediate position.

The liquid valve element of the feed valve preferably shall be a needle valve.

The present invention offers a detection system allowing measuring very accurately and reliably the actual initial and actual final positions of the liquid valve element. Consequently a very precise and accurate valve shall be obtained for the times of opening or closing the spray gun's liquid feed valve. As a result all transit times and delays of a spraycoating system shall be automatically detected and no longer need be considered when programming coating parameters relating to coating objects.

The invention's principle of measurement rests on acoustic measurements or on measuring the air pressure. The particular mechanism in the spray gun controls an air pulse which lasts the time needed by the liquid valve element to move from its initial position (closed or open valve seat position) to its final position (closed or open valve seat position). This air pulse may be detected using a valve element position sensor measuring air pressure or sound. The valve element position sensor may be mounted on the spray gun or preferably it may be configured separately from it and be connected to it by a hose. The air pulse is detected in the valve body position sensor by measuring the acoustics or pressure and it shall be used for control and/or signaling and preferably be converted into an electrical signal. This electrical signal is then amplified electronically and preferably by resort to a filter it shall also be rendered insensitive to ambient air pressures. In a special embodiment of the present invention, the electrical signal is digitized in such a way that an electrical pulse corresponding to the time pulse width of the air pulse is generated at the output of the valve element position sensor. As a result, an electrical, digital signal reflecting the time of motion of the liquid valve may be measured at the output of the valve element position sensor and can be directly analyzed by a control system or in a computer for purposes spraycoating operation. Such a device and such a procedure offer the advantage that the sensor does not require electrical leads and connectors that otherwise would have to be hooked up to the spray gun. This feature offers high safety and reliability of operation, soiling and jeopardy of explosions being precluded. The compressed air hose connecting the valve element position sensor to the spray gun may be integrated within one pack also containing hoses applying compressed air to the spray gun to act as compressed atomizing air and/or compressed shaping air and/or to the coating liquid.

The valve element position sensor may be designed in such manner that the electrical signal is electrically isolated by means of an optic coupler.

BRIEF DESCRIPTION OF THE DRAWINGS

The present invention is elucidated below by means of illustrative, preferred embodiments and in relation to the attached drawings.

DETAILED DESCRIPTION OF THE PREFERRED EMBODIMENTS

Figure 1:
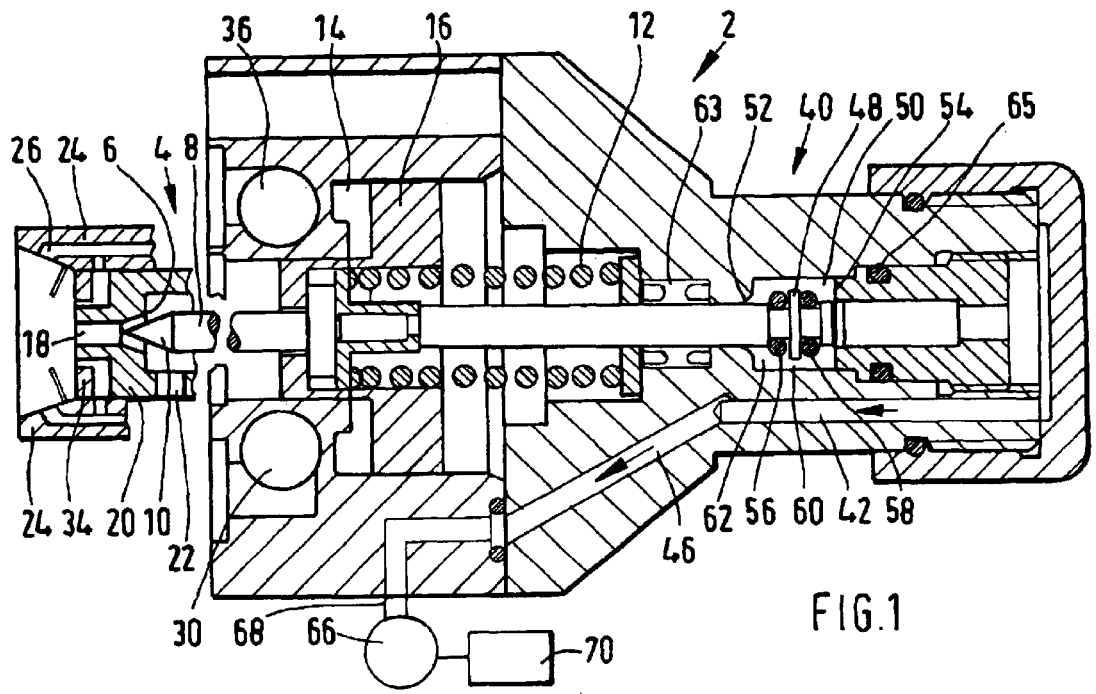
FIG. 1 schematically shows an axial section of a spray-coating device of the invention, a liquid valve element of a liquid feed valve being situated in an intermediate position between a fully open and a fully closed position of the liquid valve.
Figure 2:
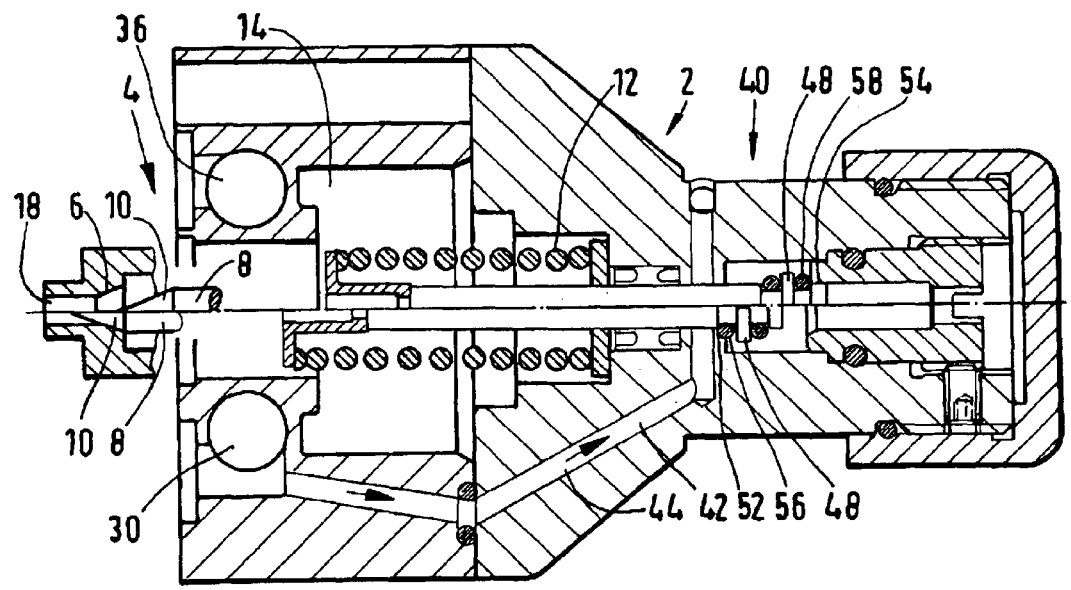
FIG. 2 shows parts of the spraycoating device of FIG. 1 which were rotated about a longitudinal valve axis, the liquid valve element being shown the fully closed valve position in the lower drawing half and in the fully open liquid valve position in the upper drawing half, FIG. 3 schematically shows a longitudinal section of a further embodiment of a spraycoating device of the invention used for coating liquid, and FIG. 4 schematically shows a longitudinal section of a further embodiment of the invention of a spraycoating device for coating liquid.

FIGS. 1 and 2 show an axial section of a liquid spray-coating device of the invention for coating liquid and include a coating liquid spray gun 2 containing a liquid feed valve 4 fitted with a liquid valve seat 6 and a liquid valve element 8 in the form of a needle having a conical tip 10. The liquid valve element 8 is linearly displaceable relative to the liquid valve seat 6 between a fully closed liquid valve position shown in the lower half of FIG. 2 and a fully open liquid valve position shown in the upper half of FIG. 2. FIG. 1 shows the valve element 8 in an arbitrary intermediate position between the open and closed liquid valve positions of FIG. 2.

The liquid valve element 8 is biased by a compression spring 12 toward the closed position and is driven against the force of said spring 12 by the compressed control air in a pressurized control chamber 14 on a control piston 16 which is ganged to the liquid valve element 8 to attain joint linear motion.

The liquid valve seat 6 is configured on the back side of a nozzle duct 18 of an atomizing nozzle 20 which atomizes coating liquid, fed to its rear side through a liquid duct 22, on the front side of the atomizing nozzle when the liquid feed valve 4 is open.

Horns 24 projecting forward beyond the atomizing nozzle 20 and fitted with compressed-gas shaping outlets 26 may be provided, said gas shaping the atomized jet of coating liquid of the nozzle duct 18 and illustratively being applied through a pressurized gas duct 30.

In addition to or instead of the shaping-gas outlets 26, one or more atomizing gas outlets 20 may be provided at the front end of the spray gun 2, for instance in the atomizing nozzle 20 and/or in the horns 24, from which outlets 20 the compressed atomizing gas may issue and may enhance the coating liquid's atomization. The compressed atomizing gas may be applied through the same compressed gas duct 30 as the compressed shaping gas, or, in another embodiment of the spray gun 2, it may be applied through a separate compressed gas duct 36.

One or several high voltage electrodes 38 used to electrically charge the coating liquid may be mounted in or next to the flow path of the coating liquid, preferably downstream of the nozzle duct 18.

In the present invention, the spray gun 2 comprises a measuring valve device 40 mounted in a compressed gas measuring flow path 42 and ganged to the liquid valve element 8 for purposes of joint axial displacement, being driven by said element 8. Other directions of displacement besides the shown axial one also may be carried out within the design of the present invention.

As a result, the measuring valve device 40 may be kept in a closed position sealing off the compressed gas measuring valve flow path 42 as a function of the positions of the liquid valve element 8 whenever the liquid feed valve 4 assumes its fully closed position and whenever it is in its fully open position, both positions being shown in FIG. 2. However the measuring valve device 40 shall be kept by the liquid valve element 8 in an open position keeping the compressed gas measuring valve flow path 42 open whenever the liquid valve element 8 assumes an arbitrary intermediate position—one of which is shown in FIG. 1—between its fully open liquid valve position and its fully closed liquid valve position. Consequently, and depending on compressed gas flowing or not through the measuring valve device 40, it may be automatically ascertained whether the liquid valve element 8 assumes one of the two positions, namely the fully open or fully closed valve position of FIG. 2 or assumes an arbitrary intermediate position of which one is shown in FIG. 1.

A number of sources of compressed gas is applicable for the compressed gas in the measuring valve flow path 42. One way is to apply the compressed gas through a separate line to the spray gun. However, in advantageous manner regarding the required materials, weight and operational safety/reliability, the compressed gas in the measuring valve flow path 42 shall be branched off one of the compressed gas ducts 30 or 36 containing compressed atomizing or shaping gases or containing a compressed gas serving both purposes. As shown by FIG. 2, the compressed gas in the measuring valve flow path 42 branches off the compressed gas duct 30 of which the compressed gas may be either atomizing or shaping or both.

In FIG. 2, the spray gun 2 is shown rotated about the longitudinal axis of the liquid valve element 8 relative to FIG. 1. As a result FIG. 2 shows a segment 44 of the compressed gas measuring flow path 42 upstream of the measuring valve 40, and FIG. 1 shows a downstream segment 46 of said path 42.

The measuring valve device 40 comprises a measuring valve element 48 within a valve chamber 62 fitted at mutually opposite chamber ends with a compressed gas intake aperture 52 and with a compressed gas outlet aperture 54, each in the form of a valve seat. The measuring valve element 48 is linearly displaceable by the liquid valve element 8 so it may be alternatively closing or opening the two valve apertures 52 or 54, one of said apertures being fully open when the other is fully closed, and vice versa.

The measuring valve element 48 preferably comprises two valve fittings, for instance valve seats 56 or 58, the fitting 56 being hermetically applicable against the compressed gas intake aperture 52 and the fitting 58 against the compressed gas outlet aperture 54. The measuring valve 40 therefore contains two mutually coupled valves 52/56 and 54/58.

The compressed gas intake valve aperture 52 and the compressed gas outlet valve aperture 54 are connected by a compressed gas flow path 60 on their opening side which can be sealed by the measuring valve element 48, said flow path 60 being alternatively sealed by closing the compressed gas intake aperture 52 or by closing the compressed gas outlet aperture 54.

As regards the embodiment of FIG. 1 and FIG. 2, the measuring valve element 48 is configured within the valve chamber 62 and is spaced from the wall of the valve chamber, whereby the compressed gas flow path 60 between the compressed gas intake valve aperture 52 and the compressed gas outlet valve aperture 54 is constituted by the spacing between the measuring valve element 48 and the wall of the valve chamber 62. The valve chamber 62 is sealed on both sides by the resp. seals 63 and 65.

A particular embodiment mode of the present invention provides a sensor 66 generating a signal depending on compressed gas flowing or not through the measuring valve device 40. If the compressed gas measuring valve flow path 42 is not supplied with compressed gas from one of the compressed gas ducts 30 or 36 feeding atomizing or shaping compressed gas, but instead from an independent compressed gas source, then the compressed gas sensor 66 may be mounted in the upstream segment 44 or in the downstream segment 46, that is, upstream or downstream of the measuring valve device 40. If, on the other hand and as shown in the embodiment of FIGS. 1 and 2, the compressed gas in the measuring valve flow path 42 is branched off the compressed gas duct 30 or 36 for purposes of obtaining atomizing or shaping compressed gases, then the sensor 66 shall be preferably mounted as shown in FIGS. 1 and 2 downstream from the two measuring valves 52/56 and 54/58.

The sensor 66 may be mounted on the spray gun 2 or preferably be configured separately from it and may be connected or connectable by means of a compressed air line 68, preferably a hose to the upstream segment 48 of the compressed gas measuring valve flow path 42.

Depending on compressed gas moving or not through the compressed gas measuring valve flow path 42, the sensor 66 generates a preferably electrical signal which may be used to control the liquid feed valve 4 and/or optically and/or acoustically displaying the valve position of liquid valve element 8. Preferably the sensor 66 is connected at its output to transmit signals to a control unit 70 in order to drive the liquid valve element 8 using compressed control air in the compressed air control chamber 14. In this manner automatic opening and closing of the liquid feed valve 4 may be adjusted to the positions relative to the spray gun 2 of objects to be coated.

The sensor 66 may be a pressure sensor responding to the pressure of the compressed gas passing through the measuring valve device 40. In another embodiment mode, the sensor 66 may be acoustic and respond to acoustic noises of the compressed gas moving through the measuring valve device 40.

Figure 3:
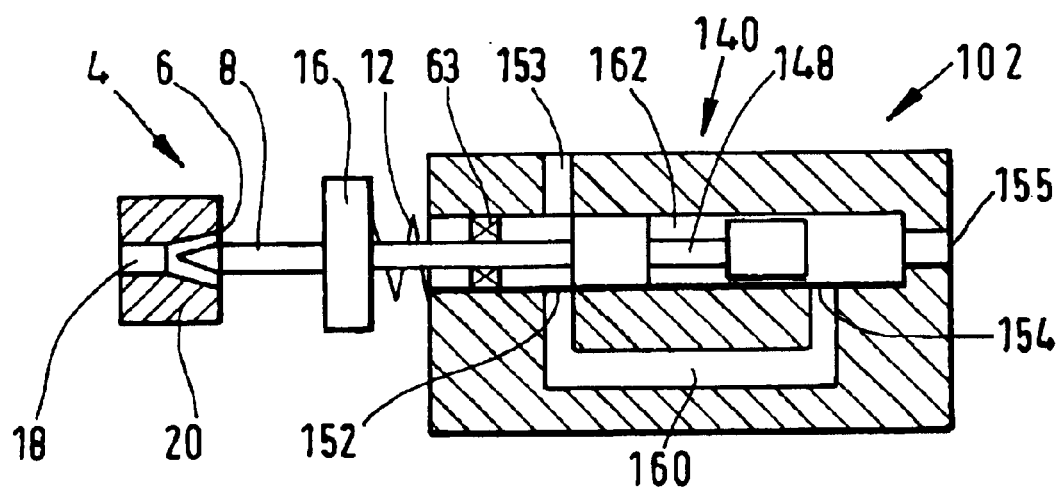

As regards the embodiment shown in FIG. 3, the compressed gas flow path between a compressed gas intake valve aperture 152 and a compressed gas outlet valve aperture 154 is constituted by a bypass 160 to the valve chamber 162 within which the measuring valve element 148 of a measuring valve device 140 is linearly displaceable between the compressed gas intake valve aperture 152 and the compressed gas outlet valve aperture 154. The measuring valve element 148 seals the compressed gas intake valve aperture 152 if the liquid valve element 8 completely seals off the liquid valve seat 6 and thereby assumes the liquid valve closed position. During that time the compressed gas outlet valve aperture 154 remains open. However the measuring valve element 148 seals off the compressed gas outlet valve aperture 154 when the liquid valve element 8 assumes a liquid valve open position relative to the liquid valve seat 6. During that time the compressed air intake valve aperture 152 remains open.

Only in its open valve state does the compressed gas intake valve aperture 152 subtend a flow path through the valve chamber 162 to a compressed gas intake 153 which is connected to the upstream segment 44 of the compressed gas measuring valve flow path 42 of FIGS. 1 and 2. Only in its open state does the compressed gas outlet valve aperture 154 communicate flow-wise through the valve chamber 162 with a compressed air outlet 155 which is connected to the downstream segment 46 of the compressed gas measuring valve flow path 42 of FIGS. 1 and 2. The liquid valve element 8 (valve needle) of FIG. 3 is fitted with a pneumatically driven piston 16 and a compression spring 12 corresponding to FIGS. 1 and 2. Other embodiment modes comprise one or more boreholes in the measuring valve element to connect the compressed gas intake 153 with the intake valve aperture 152 and/or allowing connecting the compressed gas outlet 155 to the outlet valve aperture 154, instead of passing through the valve chamber 162. Moreover such connections may consist in part of the borehole and in part of the valve chamber.

The spray gun of FIG. 3 exhibits the same features as the spray gun 2 of FIGS. 1 and 2 unless differences regarding FIG. 3 were explicitly noted.

Figure 4:
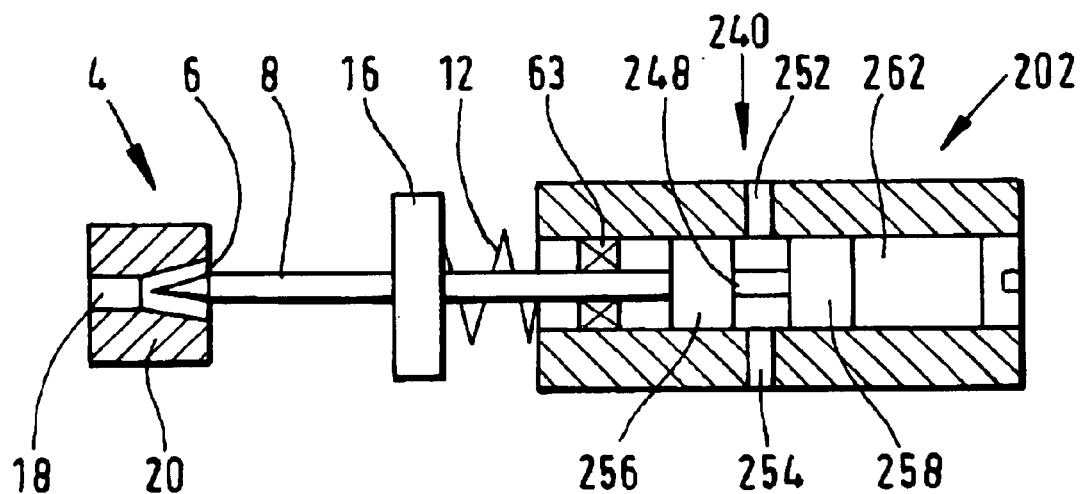

FIG. 4 shows a spray gun 202 comprising a measuring valve element 248 which is linearly displaceable, by means of the liquid valve element 8 to which it is ganged for joint displacement, within a valve chamber 262 of a measuring valve device 240. The measuring valve element 248 is a valve slider resting in hermetically sealing manner against the chamber's lateral wall. A compressed gas intake valve aperture 252 and a compressed gas outlet valve aperture 254 are configured in said chamber lateral wall in mutually adjacent manner, for instance resting against each other, said apertures being alternatively connectable by means of the measuring valve element 248 or being mutually separable by closure depending on the axial positions of the measuring valve element 248. The two apertures 252 and 254 are mutually separated flow-wise when the liquid valve element 8 assumes the fully closed liquid valve position or the fully open one. However the two apertures 252 and 254 are communicating flow-wise through the valve chamber 262, namely between two axially apart valve slider plungers 256 and 258 which seal the valve chamber 262 when the liquid valve element 248 assumes an intermediate position between the said liquid valve end positions. The measuring valve element 248 constitutes a passage through the valve chamber 262 between the apertures 252 and 254. This feature also may be attained in another embodiment mode by one or more boreholes in the measuring valve element 248 instead of using the valve chamber. Moreover such communications also may be attained in part using such borehole and in part using the valve chamber.

As shown in FIGS. 1 and 2, the liquid valve element 8 of FIG. 4 may be driven pneumatically by a control piston 16 and by a compression spring 12 in the manner already discussed in relation to FIGS. 1 and 2.

The measuring valve device 240 and the spray gun 202 of FIG. 4 are designed in the same manner as the embodiment of FIGS. 1 and 2 except for the differences discussed above in relation to FIG. 4.

The compressed gas may be air or another gas.

What is claimed is:

1. A spraycoating device for a coating liquid, said device comprising a coating liquid spray gun which contains a liquid feed valve fitted with a liquid valve seat and a liquid valve element that is displaceable relative to said seat between a fully closed liquid valve position and a fully open liquid valve position wherein the spray gun contains a measuring valve device configured in a compressed gas measuring valve flow path and is ganged to the liquid valve element to implement joint displacement with said liquid valve element so as to be driven by said liquid valve element, the measuring valve device being designed in such a way that, depending on the positions of the liquid valve element, said measuring valve device shall assume a closed position sealing off the compressed gas measuring valve flow path when the liquid valve element assumes the fully closed liquid valve position and when the liquid valve element assumes the fully open liquid valve position, but said measuring valve device shall always be in an open position keeping open the compressed gas measuring valve flow path when the liquid valve element assumes an arbitrary intermediate position between the fully open and the fully closed liquid valve positions, whereby, and depending on compressed gas flowing or not through the measuring valve device, it may be automatically determined whether the liquid valve element assumes one of the fully open or closed liquid valve positions, or an arbitrary intermediate position.

2. The spraycoating device as claimed in claim 1, wherein the spray gun is fitted with a compressed gas duct supplying compressed gas to a flow path of the coating liquid and the compressed gas measuring valve flow path is branched off said compressed gas duct.

3. The spraycoating device as defined in claim 1, wherein the measuring valve device comprises a measuring valve element which is linearly displaceable by the liquid valve element within a valve chamber between a compressed gas intake valve aperture at one chamber end zone and a compressed gas outlet valve aperture at the other chamber end zone in order to alternatively close or open either of these two apertures and the compressed gas intake valve aperture and the compressed gas outlet valve aperture communicate with each other through a compressed gas flow path which can be closed by the measuring valve element alternatively by closing the compressed gas intake valve aperture or by closing the compressed gas outlet valve aperture, each time one valve aperture being open while the other is closed, and vice-versa.

4. The spraycoating device as claimed in claim 3, wherein the measuring valve element is mounted in the valve chamber and is configured laterally apart from a valve chamber wall, the compressed gas flow path being constituted by the spacing between the measuring valve element and the chamber wall between the compressed gas intake valve aperture and the compressed gas outlet aperture on the opening side which can be sealed off by the measuring valve element.

5. The spraycoating device as claimed in claim 3, wherein the compressed gas flow path between the compressed gas intake valve aperture and the compressed gas outlet valve aperture is constituted by a bypass to a valve chamber and wherein the measuring valve element is linearly displaceable between the compressed gas intake valve aperture and the compressed gas outlet valve aperture.

6. The spraycoating device as claimed in claim 1, wherein the measuring valve comprises a measuring valve element which is linearly displaceable within a valve chamber by the liquid valve element to which said measuring valve element is ganged to implement joint displacement, the measuring valve element is a valve slider resting in hermetically sealing manner against the chamber lateral wall, a compressed gas intake valve aperture and a compressed gas outlet valve aperture are constituted in the lateral chamber wall and can be alternatively made to communicate with each other or be isolated from each other by the measuring valve element depending on the axial positions of the liquid valve element, the two apertures being mutually separate flow-wise when the liquid valve element assumes the fully closed liquid valve position or the fully open liquid valve position, however the two apertures communicating with each other flow-wise when the liquid valve element assumes an arbitrary position between said fully open and closed liquid valve positions.

7. The spraycoating device as claimed in claim 1, further comprising a sensor generating a signal depending on compressed gas flowing or not through the measuring valve device.

8. The spraycoating device as claimed in claim 7, wherein the sensor is connected on the downstream side of the measuring valve device to the compressed gas measuring valve flow path.

9. The spraycoating device as claimed in claim 8, wherein the sensor is configured spatially apart from the spray gun and is connected or connectable through a compressed gas line to the compressed gas measuring valve flow path.

10. The spraycoating device as claimed in claim 7, wherein the sensor is connected to a control unit to drive the liquid valve element relative to the liquid valve seat as a function of the relative positions of objects to be coated and the spray gun.

11. The spraycoating device as claimed in claim 7, wherein the sensor is a pressure sensor responding to the pressure of the compressed gas of the measuring valve device.

12. The spraycoating device as claimed in claim 7, wherein the sensor is an acoustic sensor responding to acoustic noises in the compressed gas flow path of the measuring valve device.

* * * * *